United States Patent Office 3,232,792
Patented Feb. 1, 1966

3,232,792
METHOD FOR PRODUCING HYPERPURE SILICON
Theodor Rummel and Hans-Friedrich Quast, Munich, and Joachim Haus, Pretzfeld, Upper Franconia, Germany, assignors to Siemens & Halske Aktiengesellschaft, Berlin, Germany, a corporation of Germany
Continuation of abandoned application Ser. No. 861,317, Dec. 22, 1959. This application Oct. 10, 1962, Ser. No. 230,033
Claims priority, application Germany, Dec. 23, 1958, S 61,117
10 Claims. (Cl. 117—201)

This is a continuation of our application Serial No. 861,317, filed December 22, 1959, and now abandoned.

Our invention relates to methods and apparatus for making hyperpure silicon intended primarily for electric semiconductor devices such as transistors, diodes and other rectifiers. It particularly relates to a method for producing monocrystalline silicon by precipitating it upon a long and thin carrier rod of previously prepared hyperpure silicon.

In such a method the silicon is produced by preheating a long and thin carrier rod of hyperpure silicon held at both ends by respective electrodes, and then supplying the rod with electric current through the electrodes to further heat it to a high temperature while exposing the rod to a reaction gas which surrounds and preferably flows along the rod, and which consists of a purified gaseous silicon compound, alone or mixed with pure hydrogen, whereby silicon is precipitated and crystallized onto the carrier rod, thus gradually converting it to a thick silicon body of the desired cross section.

Such a method is described and claimed in the copending application of Schweikert et al., Serial No. 665,086, filed June 11, 1957, and now Patent No. 3,011,877.

With a high degree of purity of the substances used as the reaction gas, the precipitated silicon, too, is extremely pure and is deposited exclusively upon the highly heated carrier rod, provided the other portions of the reaction assembly are not appreciably heated during the operation. For producing a high-quality crystalline constitution of the precipitated silicon, the surface temperature of the carrier rod must be adjusted and maintained at a definite constant value depending essentially upon the type of the silicon compound being used and, as the case may be, also upon the concentration of that compound in the reaction gas. For example, if the reaction gas consists, in the preferred manner, of hydrogen mixed with $SiHCl_3$ (constant molar ratio $SiHCl_3:H_2$ approximately equal to 0.04), the optimum temperature for formation of a high-quality monocrystal is at 1135° C. It has therefore been proposed to keep the surface temperature of the carrier under continuous observation and to immediately compensate any changes in operation by actuation of regulating means, for example a controllable resistor, connected in the electric circuit of the carrier rod.

It is desirable, however, to maintain a high reaction temperature only at the carrier surface but not at any other part or locality of the processing equipment and space so that the precipitation of silicon is limited to the carrier, not only for best feasible results and economy of operation but also for preventing premature opaqueness of observation windows. In this respect, we have found that the known silicon precipitation methods leave much to be wanted because the extremely high temperature at the rod is accompanied by a still rather high temperature of the gas near the rod and requires a considerable amount of cooling of structural vessel components.

It is an object of our invention to improve the temperature regulation in silicon precipitation methods of the above-mentioned kind so as to afford obtaining and preserving a given high pyrolytic processing temperature at the carrier with a much colder flow of reaction gas than heretofore used and required for that carrier temperature, thus reducing the temperature obtaining throughout the gas space around the carrier, including the walls and other components of the processing vessel.

Another object of our invention, akin to the one mentioned, is to reduce the cooling requirements of the vessel structure used for processing; and still another object is to improve the resulting silicon product by reducing the danger of "wild" crystal seeds being formed in the gas and apt to disturb the crystal growth.

To achieve these objects as well as further objects and advantages set forth hereinafter, and in accordance with a feature of our invention, we proceed as follows. We first heat the silicon carrier rod by passing electric current therethrough and, as the rod thus becomes heated to an increasingly higher temperature while decreasing its electric resistance, we keep increasing the applied voltage, and thus also the current driven through the rod, up to the maximum voltage that can prevail continuously along the current-traversed rod, such maximum being characteristic of the particular silicon rod and its temperature; and we then continue increasing the current as the voltage, beyond its maximum, declines to lower values. Simultaneously, we pass cold precipitation gas into contact with the carrier rod while maintaining the electric conditions so that an increase in current accompanies a decrease in voltage (descending portion of the current-voltage characteristic) and we thus establish and maintain desired precipitation temperature of the carrier surface by control or regulation of the electric heating power while continuing to operate in the descending range of the characteristic.

Since this method requires reducing the resistance value of the carrier at the beginning of the precipitation method to a small value, we preferably employ auxiliary heat control means in addition to the source of operatng current or in lieu of that source, for sufficiently increasing the initial heating or reducing the cooling of the carrier until the carrier has attained the condition that a current flowing through the carrier from the normal source of operating voltage is capable, despite the strong cooling effected by the cold gas during operation, of further increasing the temperature of the carrier, with a simultaneous decrease in terminal voltage and increase in current of the carrier, thus maintaining the carrier at the temperature required for decomjosing the gaseous silicon compound and obtaining a compact precipitation of silicon substance upon the carrier.

In order that the present invention may be readily carried into effect, it will now be explained with reference to the accompanying drawings, in which:

FIG. 1 presents three graphs of the current-abscissae, voltage-ordinate characteristics of the silicon carrier rod, at three stages of the precipitation process.

FIGS. 2 and 3 are graphs, the significance of which is explained below; and

It is known that the specific electric resistance of hyperpure, intrinsically conductive silicon decreases with increasing temperature in accordance with an exponential law. This has the consequence that in the above-described method the resistance of the carrier must decrease in the intrinsic range when the current loading is increased, even though the cross section is kept constant. It follows therefrom, and has been confirmed by tests made in conjunction with the present invention, that the current-voltage characteristics of the carrier will correspond at various stages to the qualitative curves apparent from FIG. 1 with given conditions of cooling, radiation input and radiation output in thermal equilibrium with the carrier. The electric energy dissipated thermally from the carrier by radiation, convection or the like, is equal to the electric power consumed in the carrier. For example, according to the initial current-voltage characteristic of a silicon carrier rod shown at I in FIG. 1, the voltage drop U along the semiconductor body at first increases with increasing current load J of the carrier and reaches a voltage maximum $U^I_{max}$ at a given current value $J_I$, whereafter the voltage drop U monotonously declines with further increase in current J. With constant cooling conditions, the power supply to the carrier and converted into heat monotonously increases with increasing current J.

Figure 3:
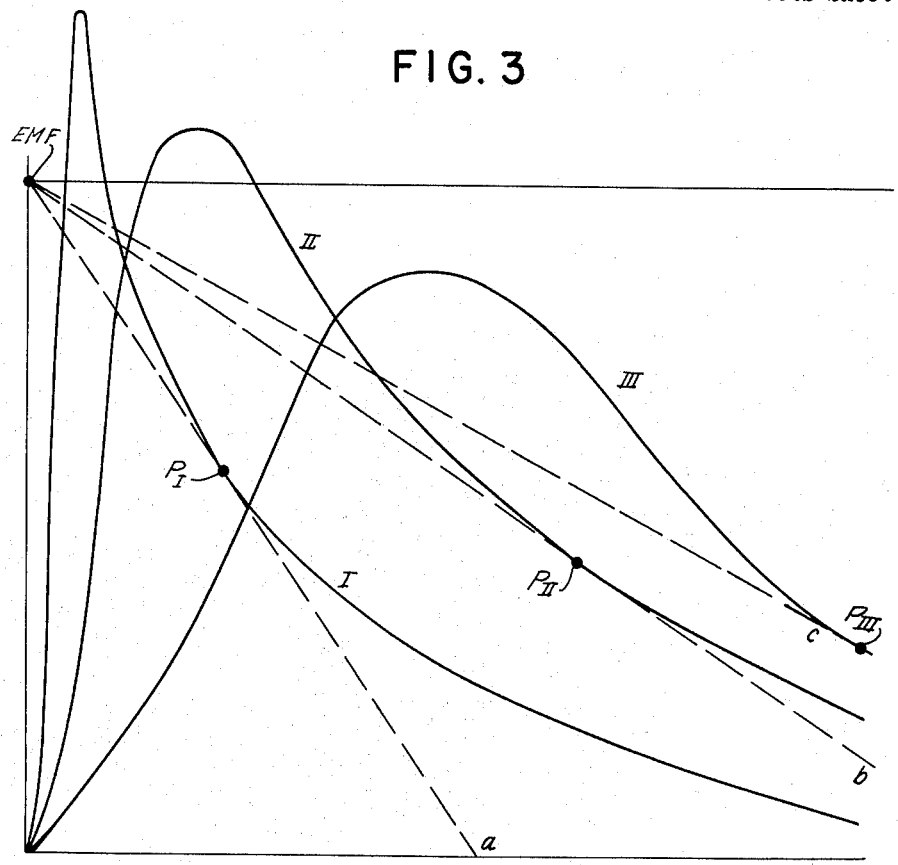

Curve II in FIG. 1 relates to a later stage of the process in which the carrier rod has grown thicker by precipitated silicon. Again a voltage maximum $U^{II}_{max}$ is observed at a current value $J_{II}$. In the abscissa range below $J_{II}$ an increasing voltage is accompanied by increasing current, but at current values higher than $J_{II}$ the decreasing voltage is accompanied by further increase in current. Curve III relates to a still more advanced stage and shows a maximum voltage $U^{III}_{max}$ for a current value $J_{III}$. FIG. 3 shows similar curves I, II and III. Any point which, on one and the same characteristic, appertains to a higher current value J, always corresponds to a higher power input (U x J) than any point corresponding to a smaller value of J.

Now, according to our invention, the precipitation of silicon is performed during the entire growing period of the rod while operating with a higher current value than corresponds at any stage to the one ($J_I$, $J_{II}$, $J_{III}$ in FIG. 1) critical for the voltage maximum, and such operation on the descending portion of the characteristic requires supplying and dissipating more electric heating power than when operating on the initial, ascending portion of the characteristic. Hence, for achieving a given high pyrolytic reaction temperature at the carrier rod, the method permits and requires supplying the reaction gas in much colder condition than if the same temperature is produced conventionally by operating in the ascending portion of the current-voltage characteristic.

This will be more fully explained hereinafter in conjunction with the following description of the apparatus exemplified in FIG. 4.

Figure 4:
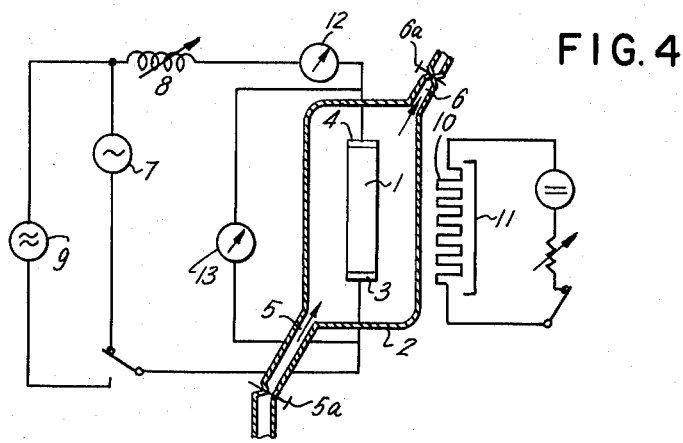
FIG. 4 illustrates an apparatus system employed to carry out the invention.

According to FIG. 4, a carrier body 1, consisting of a thin rod of hyperpure silicon, whose width is shown exaggerated for the purpose of illustration, is mounted within a reaction vessel 2 and is heated to the desired precipitation temperature by means of operating current supplied to the rod through electrodes 3, 4. The vessel 2 has a duct 5 for supplying the reaction gas, and a duct 6 for discharging the gas from the vessel. The reaction gas may consist of hydrogen mixed with $SiHCl_3$ (the constant molar ratio $SiHCl_3:H_2$ being approximately equal to .04). The carrier gas is injected at a temperature to intensely cool the carrier rod 1. Both ducts can be closed by valves 5a, 6a which also serve for controlling or regulating the gas flow. The reaction vessel 2 may consist of material conventional for such purposes, for example quartz, and its design is likewise in accordance with conventional practice. The operating current is supplied from a source of operating voltage 7, which may be constituted by an alternating current source of 50 or 220 volts or any available or convenient voltage preferably between the just-mentioned values. The energizing circuit for carrier rod 1 is provided with a variable current-limiting impedance 8, for example a reactor coil. In lieu of the operating current from source 7, a high-voltage high-frequency source 9 may be connected with the carrier rod 1 in order to preheat the carrier. When the preheating is terminated the auxiliary source 9 is disconnected and replaced by the normal source 7 of operating current.

Instead of the high-voltage source 9, a heat radiating device 10 may be used for preheating the carrier. The device 10 may consist of a helical resistor brought up to a correspondingly high temperature, and is preferably provided with a reflector 11 which concentrates the heat radiation onto the carrier 1. On the other hand, for directly reducing the cooling by increasing the environment temperature of the carrier 1, the carrier may also be preheated by passing hot hydrogen gas into the reaction vessel.

A current-measuring device 12 serves for supervising the amount of current passing through the carrier. The voltage drop of the carrier 1 is measured by means of an instrument 13 connected in parallel to the carrier and consisting, for example, of a static voltmeter.

In those cases where the preheating is not effected exclusively by means of a separate auxiliary source 9, the performance of the above-described method of the invention may take place as follows.

The operating voltage, for example 50 volts, or the available line voltage of 110 or 220 volts, is applied to the carrier, and the means for preheating are switched on. The current-limiting resistance or reactance member 8 permits controlling or regulating the heating current in the range of 10 to 150 amps and is preferably adjusted to a median value which permits regulation upwardly and downwardly to a sufficient extent. During the preheating phase, the current flowing through the carrier rod at first increases slowly and then more rapidly. The voltage of the carrier rod 1, indicated by the voltmeter 13, at first increases with a corresponding increase in the current through the carrier body. As stated, with a silicon specimen, this voltage-current relationship is maintained only over a certain voltage and current range until the voltage drop along the silicon specimen reaches a maximum (such as $U^I_{max}$ in FIG. 1) which depends upon the temperature and the size of the specimen. From then on, the specimen voltage will decrease with an accompanying further increase in current, this effect being apparent from FIG. 1 for three different diametrical sizes of the specimen. As soon as this decreasing-voltage increasing-current condition is unambiguously ascertained, the auxilary means (9 or 10 in FIG. 4) used for preheating can be switched off and the operation, which is then on the descending portion of the characteristics of FIG. 1 (or FIG. 3), may be continued by using only the source 7 of normal operating current.

The temperature of the rod required for commencement of the just-mentioned condition is at approximately 700 to 800° C. Consequently, the preheating must be so dimensioned that this carrier temperature is attained in relatively short time. A preheating period of one-quarter hour duration can easily be obtained by radiation or similar auxiliary means, with ten carrier rods of 20 cm. length and 2 to 3 mm. diameter. Such silicon rods, in cold condition, have a resistance of 3000 to 5000 ohms, in some cases also a higher resistance, whereas the resistance at the temperature of a normal precipitating operation declines to but a few ohms. Consequently, the series-connected resistance component 8 must be regulatable to a corresponding extent.

When the carrier is preheated to such an extent that a further increase in current is accompanied by a clear decrease in measured voltage, and when thereafter the preheating is discontinued, the current flowing through the carrier and then supplied exclusively from the normal suorce of operating voltage 7, assuming that the series-connected resistance component 8 is suitably adjusted, must continue to increase whereas the terminal voltage of the carrier rod, indicated by the voltmeter 13 will simlutaneously decrease. The precipitating gas, which is cold compared to the temperature of the carrier body, is passed through the vessel 2 by way of valves 5a and 6a, so as to surround the carrier body 1. This must be accomplished before the carrier body temperature increases to the melting point. The decreasing-voltage increasing-current condition must continue to be satisfied when the conditions in the reaction vessel are adapted to the cooling conditions obtaining during operation, that is, when the reaction gas, or preferably a current of hydrogen kept at the temperature of the reaction gas, is intoduced into the reaction vessel.

After adaptation of the cooling conditions to the operating condition of precipitation, the temperature of the carrier is adjusted to the value required for precipitation, for example to 1100 or 1150° C. This is effected by correspondingly controlling the series-connected circuit component 8 which simultaneously serves for stabilizing the current, the temperature being observed by means of a calibrated radiation-sensitive temperature measuring device.

In cases where the preheating is effected exclusively by an auxiliary high-voltage source 9, an intensive increase in current and a simultaneous heating of the carrier takes place after a short interval of time, assuming that a correspondingly high auixilary voltage, for example 3000 to 4000 volts, is being used. As soon as the voltage at the carrier rod, indicated by instrument 13, clearly exhibits a decrease with further increasing current, the auxiliary current source 9 can be replaced by the normal source of operating voltage 7. The further process then continues in the manner already described above.

When in the apparatus of FIG. 4 the component 8 is being adjusted to vary the voltage impressed upon the carrier body 1 (measured by meter 13) so that this voltage first rises with the current flowing through the body 1 measured by meter 12, and then decreases with further increase in current, the maximum voltage which can prevail continuously across the silicon carrier body, as well as the current value at which this maximum occurs, depends upon the size of the carrier body. When the body is thin, the attainable maximum voltage is higher than when its girth increases. The current value at which the maximum occurs increases with the girth of the body. As explained above, these values constantly change during precipitation as shown in FIG. 1 by curves I, II and III for three different girths. However, once the silicon precipitation has commenced at the proper pyrolytic rod temperature such as 1100 to 1150° C. while electrically operating in the decending portion of the initial current-voltage characteristic, the rod is kept supplied with sufficiently increasing current and is simultaneously kept so intensively cooled by the reaction gases as to maintain the operation in the descending portion. For example, when the operation commences on working point $P_I$ on curve I in FIGURE 3, it precedes through points $P_{II}$ on curve II and $P_{III}$ on curve III.

The essential advantage of such an intensive cooling resides in the fact that, on the one hand, the temperature of the carrier surface during the precipitating operation is high and that nevertheless the temperature of the gas flowing into the reaction vessel is kept at a relatively very low value. This is tantamount to the following improvements which outweight the necessity of consuming more electric power by operating according to the invention in the descending portion (instable range) of the current-voltage characteristic than when producing the same rod temperature by the prior operation in the ascending (stable) range.

The combination of intensive internal heating of the rod and intensive cooling by the gas confines the heat and the consequent precipitation to the rod surface. All other parts of the vessel, such as the gas inlet and all vessel walls are reliably kept clear of silicon. The temperature gradient between the rod surface and the surrounding gaseous silicon compound is so high that the precipitation threshold occurs only in a very thin zone of the reaction gas immediately adjacent to the carrier surface. Hence no silicon is formed in the free space otherwise occupied by the reaction gas because there the temperature is far below that of the carrier surface. This virtually avoids the occurrence of so-called "wild seeds" in the free gas phase as may otherwise attach themselves to the carrier surface and disturb the crystal being grown.

Another benefit, resulting from the intense cooling during operation at the high power required for operation in the descending portion of the characteristic, is an improved sensitivity of regulation. The ratio of the change in power $\Delta N$ resulting from an increase of the carrier current J by the amount $\Delta J$, to the output power N is determined, when operating in the ascending range of the carrier characteristic by the equation:

$$\frac{1}{N}\cdot\frac{\Delta N}{\Delta J}=\frac{1}{U}\frac{\Delta U}{\Delta J}+\frac{1}{J}$$

However, when operating in the descending range this ratio is expressed by the equation:

$$\frac{1}{N}\cdot\frac{\Delta N}{\Delta J}=-\frac{1}{U}\frac{\Delta U}{\Delta J}+\frac{1}{J}$$

The second term in the descending range of the carrier characteristic, for the same $\Delta J$ is smaller than in the ascending branch on account of the higher current. Furthermore when working in the descending range, the first term enters with a negative sign and the gradient $\Delta U/\Delta J$ in the descending branch is smaller than in the ascending branch of the current-voltage curve. It follows that when working in the descending range the change in specific power $\Delta N/N$ caused by a change in current $\Delta J$ becomes smaller than when working in the ascending branch. This is tantamount to achieving by virtue of the invention a higher sensitivity in regulation of the power and thereby of the carrier temperature, in comparison with the operation in the ascending branch of the current-voltage characteristic.

In the descending range of the current-voltage characteristic, the current-resistance curve also has a descending character. Consequently any localities of the carrier body, for example at the ends of the carrier, that may be subject to more intensified cooling than others, are also subjected to increased power supply and heating. This results in a better equalization of the temperature at the carrier surface. Consequently, when operating in the descending range, the precipitation of semiconductor substance at the ends of the carrier does not practically differ from the precipitation in the middle of the carrier, and a more uniform growth on all localities of the carrier is secured.

Further objects and advantages of the invention will be apparent from the following additional explanations.

Figures 1, 2:
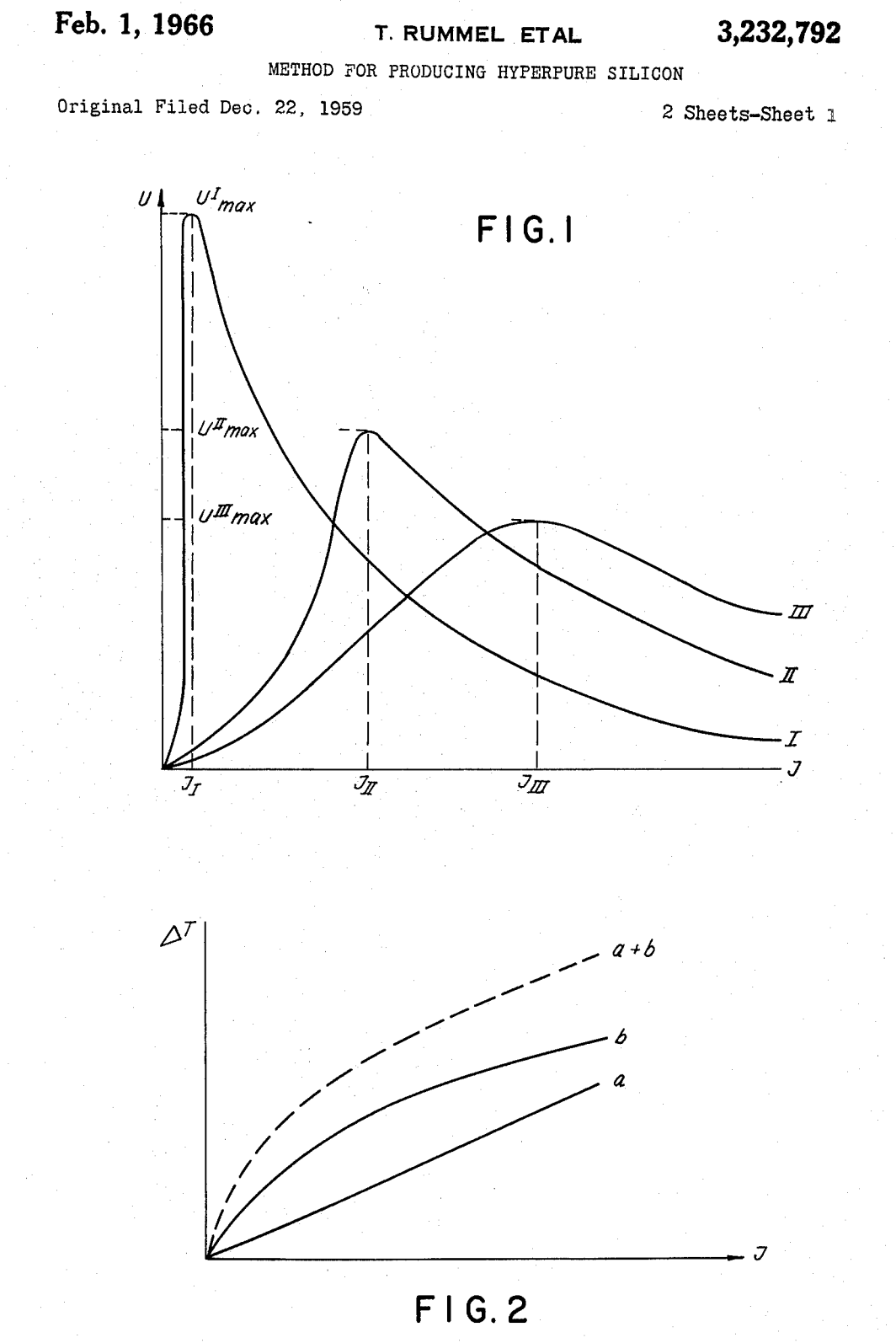

As set forth above, each current-voltage characteristic of a silicon rod, such as represented by curve II in FIG. 1, has a stable range $J<J_I$ and an instable range $J>J_{II}$, the curve shape of the characteristic being dependent upon the silicon material being used, and upon the thickness and length of the carrier rod, as well as upon the heat quantity dissipated to the environment and the cooling conditions obtaining during the precipitating operation. The thicker the carrier and the lower the environment temperature, the more is the maximum voltage displaced toward higher current values. The magnitude of the voltage $U_{max}$ increases with increasing intensity of cooling being employed and with decreasing thickness of the carrier. An increase in length of the carrier acts in the sense of increased $U_{max}$ values, whereas the value of the correlated current value is not affected. This explains why the current-voltage characteristic of the carrier, during the course of the precipitating operation, continuously reduces its maximum voltage while displacing its occurrence to higher current values according to FIG. 1 or FIG. 3.

The working point on each instantaneous characteristic adjusts itself during operation, and is determined by the resistance of the external circuit components (such as 8 in FIG. 4) connected in the heating-current circuit. This operating point is constituted by the intersection of the particular current-voltage characteristic of the carrier with the resultant current-voltage characteristic of these external circuit components. If these components are purely ohmic, their resistance characteristic is represented by the straight line $U=E-(R.J)$, in which E is the operating voltage and R the total resistance of the external circuit components. Such straight resistance lines are shown at $a, b, c$ in FIG. 3 for respective carrier characteristics I, II, III. Up to three intersections of a resistance line with the carrier characteristic, and hence up to three working points, are theoretically possible. If only one working point is present, it may be located in the stable or in the instable range of the current-voltage characteristic of the carrier. If there are two or three working points, then one working point must be located in the stable range and at least one working point in the instable range.

By correspondingly selecting the length of the carrier, as well as by minimizing the quantity of heat dissipated from the carrier to the environment per unit of time, i.e., by providing for slight cooling, it is always possible to adjust the working point in the stable range of the carrier characteristic at which the electric power consumed by the carrier with a given operating voltage will bring the carrier to the temperature required for performing the precipitating method. Such operation in the stable range of the characteristic, as practiced prior to our invention, has the advantage that the current flowing through the carrier stabilizes itself so that a relatively small power supply is sufficient. However, it also causes the above-mentioned shortcomings that, according to our invention, are eliminated only when producing the required temperature by operation in the instable range which requires intensive cooling of the carrier during precipitating operation.

The original voltage maximum (of curve I) under such cooling conditions, particularly at the commencement of the precipitation upon a carrier of the desirable thin cross section, tends to be very high. This would make it necessary, unless particular expedients are resorted to, to perform the method with very high operating voltages. However, the need for an excessively high operating voltage is overcome according to the invention by reducing during the heating-up period the initial heat losses of the carrier due to convection, heat exchange or radiation (i.e., the amount of initial cooling) and/or by additionally heating the carrier, prior to commencing the precipitating operation proper, by auxiliary heating means acting in addition to, or in lieu of, the electric heating from the source of normal operating current. Such auxiliary heating is effected by radiation, by passing gases of high temperature along the carrier, or by initially applying to the carrier a higher voltage from a separate source than is subsequently supplied from the source of normal operating current. By thus varying the cooling conditions and by the application of additional heating with the aid of radiation, conduction or convection, the voltage maximum of the initial U-J characteristic of the carrier is reduced to such an extent that it becomes at least temporarily smaller than the terminal voltage impressed upon the carrier when the source of operating current is being switched on. That is, when the carrier is heated up in this manner and when thereafter the cooling conditions are provided as are desired for the subsequent precipitating operation, then the source of operating current supplies to the carrier a current of sufficient intensity to maintain the carrier at high temperature and the current above the value required for maximum voltage of the U-J characteristic.

Similarly, the use of current sources of higher voltage has the effect of raising the resistance line ($d$ in FIG. 3), relative to the U-J characteristic of the carrier, above the U-maximum to such an extent that the carrier is preheated to a sufficiently high temperature to be thereafter kept at high temperature by means of the source of operating current alone, despite the intensive cooling then effective during the precipitating operation.

If, due to the thickening of the carrier by the precipitating substance, the descending branch of the U-J characteristic of the carrier were permitted to increase above that of the external circuit components, the intensive cooling then effective would result in an undesirable and rapid decrease in surface temperature of the carrier. This, however, can be reliably prevented by keeping, during prepicitation and simultaneous regulation of the surface temperature, the electromotive force of the operating current, as well as the magnitude of the series-connected resistances, so small that the resistance lines ($a, b, c$ in FIG. 3) resulting therefrom do not drop below the descending branch of the particular current-voltage characteristic. In this case, however, the just-mentioned electromotive force (EMF in FIG. 3), must remain at or above the value that results from the intersection of the ordinate in the U-J coordinate system with the tangent placed at the working point (such as at $P_{II}$) against the U-J characteristic of the carrier.

As mentioned, the heating-up of the rod to the temperature desired for precipitation, for example up to about 1100° C., is effected under heating or cooling conditions different from those obtaining subsequently during the precipitating operation proper. Since the gases, particularly silicochloroform and hydrogen, passing through the vessel, have very low temperatures in comparison with the desired surface temperature of the carrier, it is advisable to provide for reduced heat dissipation during the heating-up period by passing these gases into the vessel only after the carrier has attained the desired high temperature at which the voltage of the source of operating current is sufficient to keep the surface temperature of the carrier at the desired high value. With such intensified cooling, the U-J characteristic of the carrier changes in such a sense that again a very high U-maximum adjusts itself; but since, due to the already attained high temperature, of the rod, the resistance of the rod has become very small, the source of operating voltage suffices for passing a very high current through this relatively small resistance and thus to produce a high heating power which suffices to maintain the carrier at its high temperature despite the increased heat dissipation by the cold gases passing along the carrier.

When an auxiliary current source of high voltage, as shown at 9 in FIG. 4, is used for preheating, a working point in the descending range of the carrier characteristic can be adjusted as follows. The voltage of the auxiliary source is preferably so high that the current-voltage characteristic ($a$ in FIG. 3) of the external circuit components (such as 8 in FIG. 4) connected with the auxiliary source 9 will intersect the current-voltage characteristic (curve I) of the carrier only in the descending range. This results in supplying a correspondingly high energy to the carrier which increases the carrier temperature and changes the cooling conditions with the effect of flattening the carrier characteristics. Such preheating is continued until it progresses to a stage in which the current-voltage characteristic of the external circuit components (with a given adjustment of these components) intersects the characteristics of the carrier only in the instable range when exclusively using the normal source (7 in FIG. 4) of operating current. Once the external circuit components 8 are thus adjusted, the working point remains in the descending range of the carrier characteristic when one subsequently changes over to the cooling conditions that obtain during the precipitating operation proper and are determined by the supply of the cool reaction gas.

The foregoing example of starting-up operation shows that a preheating of the carrier acts in the sense of reducing the cooling conditions, that is, in the sense of reducing the maximum voltage $U_{max}$ of the current-voltage characteristic of the carrier. Such preheating can also be obtained without using a separate auxiliary voltage source (9 in FIG. 4), namely by preheating the carrier by other means, for example only by heat radiation from radiator 10, 11, to such an extent that the characteristic produced by the impressed operating voltage from the normal source 7 and by the external circuit components 8 will intersect only the instable range of the characteristic as modified by preheating of the carrier. Furthermore, the initial flattening of the carrier characteristic can also be produced by providing for reduced cooling of the carrier while it is being impressed with the operating voltage through the external circuit components. For example, if a carrier, during starting-up, is located in vacuum, the heat dissipation is limited to radiation so that a relatively low voltage will suffice to produce a working point in the descending range of the carrier characteristic. The same result can be more readily obtained if the carrier is initially surrounded by a hot atmosphere of inert gas or hydrogen, because then the radiation is reduced to a minimum.

By using such or similar methods a working point in the descending range of the carrier characteristic modified by preheating is obtained while employing the circuit components of normal operation. Since the carrier characteristic again varies when the reaction gas is being introduced, an exact adjustment of the working point, upon which the temperature of the carrier depends, is possible only after supplying the reaction gas to the processing vessel.

However, it is advisable not to bring the carrier into contact with the reaction gas immediately after terminating the preheating stage, but to keep the carrier for some additional time in a flow of purified hydrogen gas having about the same temperature as the reaction gas to be subsequently employed, so that the characteristic of the carrier can adapt itself to the conditions of normal operation. During this phase, the working point of the carrier is to be so adjusted that the carrier possesses the desired operating temperature. When the hydrogen is thereafter replaced by the reaction gas, an only slight change of the working point is required in order to thereby compensate the temperature change of the carrier.

Preferably, and in accordance with a further improvement of the invention, a source of operating current is used whose voltage E is smaller than the maximum voltage $U_{max}$ of the carrier employed at the beginning of the process under the cooling conditions obtaining during operation. These cooling conditions are determined by direct heat conductance from the carrier to the reaction gas flowing along the carrier, and also by heat radiation. As is apparent from FIG. 2, both shares of heat dissipation increase with increasing current J. The heat quantity dissipated by heat conductance to the reaction gas is proportional to the temperature difference $\Delta T$ between the carrier and the reaction gas. This dissipation by conductance, therefore, must increase in linear proportion to the current load (curve $a$) when the reaction gas, kept at constant temperature, is continuously replenished. However, the heat loss by radiation increases with the fourth power of $\Delta T$. Consequently, the heat losses due to radiation must be greater than the heat losses due to direct transfer to the reaction gas (curve $b$). The operational cooling conditions are composed of both shares (curve $a+b$); and these resultant cooling conditions decisively affect the characteristic of the carrier, as already explained.

Keeping the operating voltage E of the source (7 in FIG. 4) smaller than the maximum voltage of the carrier characteristic obtaining at the beginning of the operation, has the advantage of increased assurance that, during precipitating operation, the working point will not migrate from the instable range into the stable range of the characteristic. It is further preferable to operate with a source of operating current which has low voltage, for example normal line voltage of 110 or 220 volts.

The circuit component (8 in FIG. 4) for stabilization of the operating current J and controlling the rod temperature is preferably a controllable resistor when operating with direct current, and preferably a controllable inductance coil (reactor) when operating with alternating current. Since the current-voltage characteristic of the carrier rod changes continuously during precipitating operation, the resistance adjustment of component 8 cannot be kept constant at the initial value because its resistance characteristic, soon thereafter, might no longer intersect the instable range of the current-voltage characteristic of the carrier, so that the operating condition would shift to a working point in the stable range of the characteristic, thus disturbing the precipitating operation.

In order to prevent this, the series-connected resistance or impedance 8 and, if desired, the voltage of the source 7 of operating current are kept during precipitation at values at which the resulting straight resistance line or other characteristic of the current-stabilizing circuit component 8 remain tangent to, or preferably intersect, the descending branch of the current-voltage characteristics of the carrier rod. Thus, FIG. 3 relating to purely ohmic characteristics $a$, $b$, $c$ of the external circuit components, shows the electromotive force (EMF) and the resistance values so adjusted that each resistance line $a$, $b$, $c$ is just tangent to the corresponding current-voltage characteristic I, II, III of the carrier rod. The tangent position can also be maintained by correspondingly increasing the operating voltage E during progressing precipitation.

As a rule, however, the characteristic of the external circuit components is such that two intersections in the descending range of the carrier characteristic will result. Then, in general, the operation will adjust itself to the lower, more stable operating point.

As a rule, the continuous displacement of the carrier characteristic accompanying the increase in carrier diameter and the decrease in operating current J, occurs together with a decrease in carrier temperature which must be continuously compensated during precipitation so that the operating point is gradually displaced toward increased power supply. A simple way of doing this is to continuously measure the carrier temperature by means of a pyrometer, photocell or any other suitable temperature-sensing device responding to heat radiation, and by increasing the current through the carrier rod by reducing the resistance of the external circuit components as soon as a decrease in carrier temperature is ascertained, so that the datum value of temperature is immediately re-established.

As mentioned, the voltage of the source of operating current may be smaller than the maximum voltage $U_{max}$ at the beginning of the precipitating operation, provided the operating voltage during the precipitating operation can result in a working point continuously located on the descending branch of the carrier characteristic. The descending branch of the carrier characteristic breaks off when supplying a given maximum power depending upon the thickness of the particular carrier rod. This is because the carrier will melt through when this critical amount of power is exceeded. It is therefore advisable to keep the smallest possible, adjustable resistance of the external circuit components so large that the current resulting from this resistance, at the voltage of the source of operating current, is incapable of destroying the carrier rod as long as it has not yet increased its diameter. If this condtion is not secured during the entire course of operation, then the operating voltage must be increased during the precipitating period to such a value that the proper operating point is secured despite the increasing carrier diameter.

We claim:
1. The method of producing hyperpure silicon bodies by pyrolytic precipitation which comprises: holding an elongated hyperpure silicon carrier body at its ends by electrodes; applying between said electrodes the maximum potential which will prevail continuously across said carrier body; increasing the current through the carrier body to a point at which the voltage across the carrier body decreases with an accompanying increase in current to provide a preselected temperature of said carrier body; then maintaining a voltage between said electrodes such that a decrease in voltage between said electrodes is accompanied by an increase in current through the carrier body, so as to maintain the heated carrier body at said preselected pyrolytic temperature; and intensively removing excess heat from the carrier body surface by simultaneously passing around the heated carrier body a purified gaseous silicon compound having a temperature lower than the carrier body whereby the gaseous silicon compound is decomposed and silicon is precipitated upon the carrier body to thicken it.

2. The method of producing hyperpure silicon bodies by pyrolytic precipitation which comprises: holding an elongated hyperpure silicon carrier body at its ends by electrodes; heating said carrier body; applying between said electrodes the maximum potential which will prevail continuously across said carrier body; increasing the current through the carrier body to a point at which the voltage across the carrier body decreases with an accompanying increase in current to provide a preselected temperature of said carrier body; then maintaining a voltage between said electrodes such that a decrease in voltage between said electrodes is accompanied by an increase in current through the carrier body, so as to maintain the heated carrier body at said preselected pyrolytic temperature; and simultaneously passing around the heated carrier body a purified gaseous silicon compound having a temperature lower than the carrier body for intensively removing excess heat from the carrier body whereby the gaseous silicon compound is decomposed and silicon is precipitated upon the carrier body to thicken it.

3. The method of producing hyperpure silicon bodies by pyrolytic precipitation which comprises: holding an elongated hyperpure silicon carrier body at its ends by electrodes; heating said carrier body to a preselected temperature then maintaining a voltage between said electrodes such that a decrease in voltage between said electrodes is accompanied by an increase in current through the carrier body, so as to maintain the heated carrier body at said preselected temperature; and simultaneously passing around the heated carrier body a purified gaseous silicon compound having a temperature lower than the carrier body for intensively removing excess heat from the carrier body whereby the gaseous silicon compound is decomposed and silicon is precipitated upon the carrier body to thicken it.

4. The method of producing hyperpure silicon by pyroltic precipitation, which comprises holding an elongated carrier body of hyperpure silicon at its ends by electrodes; preheating the carrier body and applying between the electrodes a voltage sufficient to provide through the carrier body a current in the descending range of the current-voltage characteristic of the carrier body while heating the carrier body to a preselected pyrolytic precipitation temperature; thereafter passing around the heated carrier body a purified gaseous silicon compound having a temperature lower than the carrier body for intensively removing excess heat from the surface of the carrier body; and simultaneously maintaining the voltage at the electrodes and the current through the silicon carrier body within the descending range of the current-voltage characteristic of the carrier body so as to maintain the heated carrier body at the preselected precipitating temperature whereby the gaseous silicon compound is decomposed and silicon is precipitated upon the carrier body to thicken the pure silicon body.

5. The method of producing pure silicon which comprises holding an elongated carrier body of pure silicon at its ends by electrodes; preheating the carrier body to a temperature at which the voltage peak in the current-voltage characteristic of the silicon carrier body is reduced from its unheated value; applying to the electrodes a voltage sufficiently greater than the reduced voltage peak in the current-voltage characteristic of the heated carrier body to effect continued heating in the descending range of the changed current-voltage characteristic; and passing around the heated carrier body a purified gaseous silicon compound having a temperature lower than the carrier body so as to remove excess heat from the carrier body whereby the carrier is converted to a thick semiconductor body by silicon precipitating and crystallizing onto the carrier body.

6. The method of producing pure silicon which comprises holding an elongated carrier body of pure silicon at its ends by electrodes; preheating the carrier body to a predetermined temperature at which the voltage peak in the current-voltage characteristic of the silicon carrier body is reduced; applying to the electrodes a voltage sufficiently greater than the reduced voltage peak in the characteristic of the heated carrier body, but less than the voltage peak in the characteristic of the carrier body before preheating thereof to effect continued heating of the carrier body in the descending voltage portion of the changed current-voltage characteristic; and passing around the heated carrier body a purified gaseous silicon compound having a temperature lower than the carrier body to remove excess heat from the carrier body intensely whereby the carrier body is converted to a thick semiconductor body by silicon precipating and crystallizing onto the carrier.

7. The method of producing hyperpure silicon which comprises holding an elongated carrier body of hyperpure silicon at its ends by electrodes; preheating the carrier body to a predetermined temperature at which the peak voltage in the current-voltage characteristic of the silicon carrier body is reduced; applying to the electrodes electrical energy having a current-voltage characteristic wherein the voltage descends as the current increases and which intersects the changed current-voltage characteristic of the heated carrier body only in the descending range to effect continued heating of the carrier body in the descending voltage portion of the changed current-voltage characteristic; passing around the heated carrier body a cold purified gaseous silicon compound having a temperature for intensively removing excess heat from the carrier body during the continued heating while maintaining the intersection of the current-voltage characteristic of the electrical energy with the descending range of the characteristic of the carrier body whereby the carrier body is converted to a thick semiconductor body by silicon precipitating and crystallizing onto the carrier body.

8. The method of producing pure silicon which comprises holding an elongated carrier body of pure silicon at its ends by electrodes; preheating the carrier body to a predetermined temperature at which the voltage peak in the current-voltage characteristic of the silicon carrier body is reduced; applying to the electrodes electrical energy having a descending current-voltage characteristic which intersects the changed current-voltage characteristic of the heated carrier body only in the descending range, but which intersects the ascending range of the current-voltage characteristic of the carrier body before preheating thereof to effect continued heating of the carrier body in the descending range of the changed current-voltage characteristic; passing around the heated carrier body a purified gaseous silicon compound having a temperature for intensively removing excess heat from the carrier body during the continued heating while maintaining the intersection of the current-voltage characteristic of the electrical energy with the descending range of the characteristic of the carrier body whereby the carrier body is converted to a thick semiconductor body by silicon precipitating and crystallizing onto the carrier.

9. The method of producing hyperpure silicon bodies by pyrolytic precipitation, comprising heating an elongated hyperpure silicon carrier body to a preselected temperature; maintaining a voltage between the ends of said carrier body such that a decrease in voltage between said ends is accompanied by an increase in current through the carrier body, so as to maintain the heated carrier body at said preselected temperature; and simultaneously removing excess heat from the carrier body.

10. The method of producing hyperpure silicon bodies by pyrolytic precipitation, comprising heating an elongated hyperpure silicon carrier body to a preselcted temperature; maintaining a voltage between the ends of said carrier body such that a decrease in voltage between said ends is accompanied by an increase in current through the carrier body, so as to maintain the heated carrier body at said preselected temperature; and simultaneously passing around the heated carrier body a purified gaseous silicon compound to remove excess heat from the carrier body.

References Cited by the Examiner

UNITED STATES PATENTS

| | | | |
|---|---|---|---|
| 3,042,494 | 7/1962 | Gutsche | 117—106 X |
| 3,057,690 | 10/1962 | Reuschel et al. | 23—223.5 |

RICHARD D. NEVIUS, *Primary Examiner.*

W. L. JARVIS, *Assistant Examiner.*